United States Patent
Meier et al.

(10) Patent No.: US 6,190,219 B1
(45) Date of Patent: Feb. 20, 2001

(54) SEAL SYSTEM FOR OUTBOARD MOTOR COVERS

(75) Inventors: Peter W. Meier, Stuart; Don Moore, Palm City, both of FL (US)

(73) Assignee: Outboard Marine Corporation, Waukegan, IL (US)

( * ) Notice: Under 35 U.S.C. 154(b), the term of this patent shall be extended for 0 days.

(21) Appl. No.: 09/179,947

(22) Filed: Oct. 27, 1998

(51) Int. Cl.⁷ .................................................. B63H 20/32
(52) U.S. Cl. ............................................. 440/77; 440/900
(58) Field of Search ............................... 440/900, 75–77; 123/195 P, 195 C, 198 E; 277/646, 645, 605

(56) References Cited

U.S. PATENT DOCUMENTS

| | | | |
|---|---|---|---|
| 4,665,653 | * | 5/1987 | Franz et al. ................. 114/201 A |
| 4,930,790 | * | 6/1990 | Sheridan .............................. 440/77 |
| 5,135,239 | | 8/1992 | Kato et al. . |

* cited by examiner

*Primary Examiner*—Ed Swinehart
(74) *Attorney, Agent, or Firm*—Armstrong Teasdale LLP

(57) ABSTRACT

A seal system for a motor cover of an outboard motor includes a resilient hollow tubular seal member for providing a substantially water impervious seal at a joint between the motor cover and an adjoining housing member of the motor and wherein the seal member is pressurized with air to expand in the joint.

13 Claims, 4 Drawing Sheets

SEAL SYSTEM FOR OUTBOARD MOTOR COVERS

BACKGROUND OF THE INVENTION

1. Field of the Invention

The present invention relates generally to a seal system for the covers of an outboard motor and, more particularly, to a seal system which uses engine crankcase pressure to inflate a hollow tube seal arrangement to more positively seal the motor covers against intrusion of ambient water.

2. Description of the Related Art

It is a common practice to enclose an outboard motor with an assembly of cowls or motor covers to protect the engine components from ambient water intrusion and the harmful effects thereof Particularly the effects of seawater can result in large deposits of corrosive salt on engine components due to evaporation of the seawater by engine heat. It is also common practice to provide an upper motor cover which is readily removable for servicing of the engine. Conventionally, it has been the practice to employ compression-type members to seal motor covers. However, sealing is complicated by the fact that engine parts move relative to each other due to engine vibration, due to hydrodynamic forces which can deflect mating parts, and due to vacuum under the motor covers which tends to deflect the covers inwardly. All of these forces can cause compression seals to open, allowing water to intrude into the engine compartment.

In an effort to provide for effective sealing with compression type seals it has been necessary to provide quite high sealing forces. For example, with a conventional upper motor cover it is common to apply a pressing force in the range of 100 to 200 kilograms to the seal member in assembling the upper cover in order to obtain satisfactory sealing. Such high compressive force can cause undesirable distortion of the cover. In addition, in order to provide the necessary sealing force a latch mechanism must be used which can be large and quite unsightly.

The problems associated with satisfactory sealing of motor covers are discussed, for example, in U.S. Pat. No. 5,135,239 issued to Kato et al. In that patent, Kato et al. propose a seal which comprises a base portion for affixing the seal to the motor cover. A seal portion is also provided for sealingly engaging the tray which extends beneath the engine. An intermediate portion integrally connects the base portion with the seal portion and the intermediate portion is deflected by bending upon assembly of the cover to the tray for sealing engagement of the seal portion without necessitating compression thereof.

While the seal system as just described provides some improvement in the sealing of outboard motor covers, it is desirable to provide a system which even more positively seals motor covers to avoid water intrusion in the face of the aforementioned engine vibration and hydrodynamic forces and effects of engine vacuum conditions. It is further desirable to provide such a seal system which allows the associated motor covers to be readily removed for servicing of the engine. Still further, it is desirable to provide such a seal system which is cost effective to manufacture and implement, thus avoiding excessive expense to the ultimate motor purchaser.

SUMMARY OF THE INVENTION

The present invention improves over the prior art by providing a seal system for a motor cover of an outboard motor including a resilient hollow tubular seal member for providing a substantially water impervious seal at a joint between the motor cover and an adjoining housing member of the motor and wherein the seal member is pressurized with air to expand in the joint.

BRIEF DESCRIPTION OF THE DRAWINGS

The foregoing and other novel features and advantages of the invention will be better understood upon a reading of the following detailed description taken in conjunction with the accompanying drawings wherein.

DETAILED DESCRIPTION OF THE PREFERRED EMBODIMENTS

Figure 1:
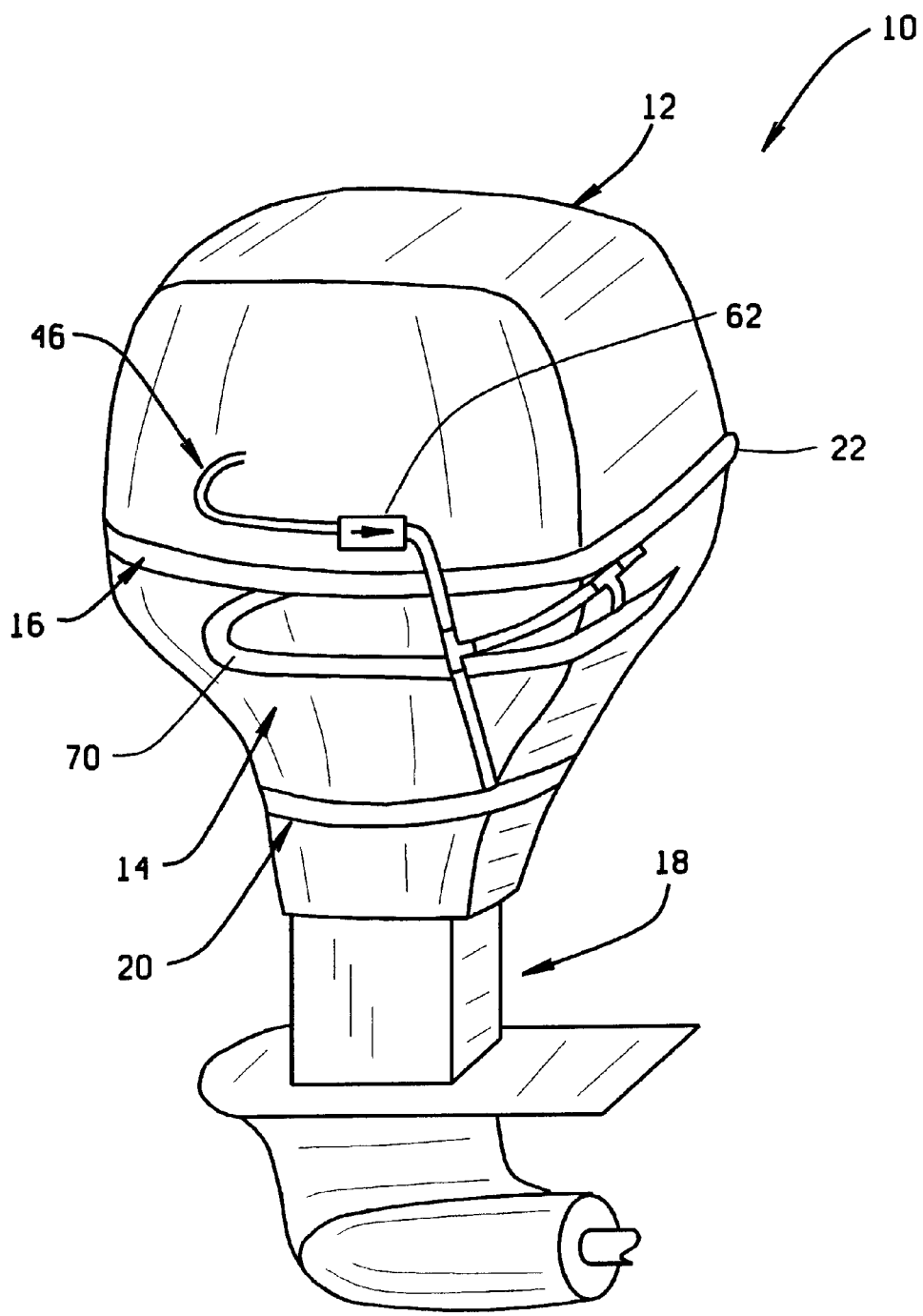
FIG. 1 is a schematic perspective view of an outboard motor fitted with a motor cover seal system in accordance with the invention.

Referring now to the drawings, and initially to FIG. 1, an outboard motor is illustrated in schematic form and designated generally by the reference numeral 10. The illustrated motor 10 has an upper motor cover 12 which serves to protect from the elements an internal combustion engine (not shown) in a manner well-known in the art. Preferably, and for reasons which will be discussed hereinafter, the engine is of a fuel injected two-stroke type. The upper motor cover 12 is configured to mate with a lower motor cover 14 along its entire lower peripheral edge defining a first joint 16. The lower motor cover is, in turn, configured to mate with an exhaust housing 18 along its entire peripheral edge defining a second joint 20. The motor 10 is shown with a seal system as will be described hereinafter.

Figure 2:
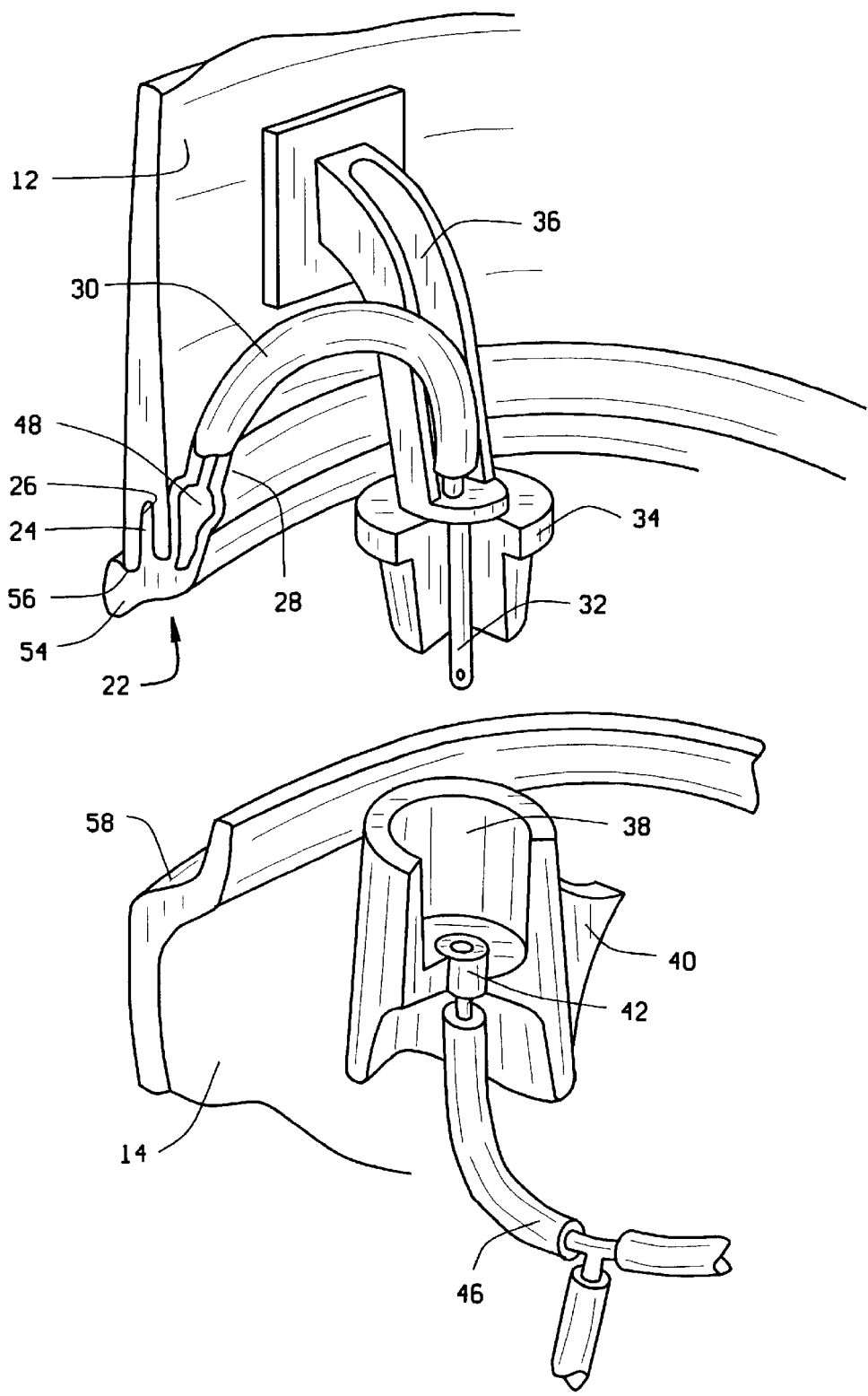
FIG. 2 is a fragmentary perspective view of one form of seal system in accordance with the invention.

Turning now to FIG. 2, a portion of the upper motor cover 12 is shown as being fitted with hollow resilient tubular seal member 22. The seal member is molded with a projecting portion 24 which is received by a peripheral slot 26 formed in the lower edge of the cover 12. The cooperation of the projecting portion 24 and slot 26 serves to retain the seal member 22 fixed to the upper motor cover 12. A tee joint 28 molded into the seal member 22 provides for attachment of short tube member 30 which is connected to a valve needle 32. The valve needle 32 is supported by a rubber grommet 34 which, in turn, is rigidly supported by a locating bracket 36 secured to the upper motor cover 12.

The grommet 34 is configured to be slidingly received by a socket 38 which is rigidly secured to the lower motor cover 14 by a bracket 40. Internal to the socket 38 is a valve 42, which may be of a football valve type, a flapper or spring and disk type. The valve 42 is connected to a hose 46 which, in turn, is connected to a source of air pressure as will be explained hereinafter. It can be seen that the grommet 34 and socket 38 cooperate to form a manually separable connector which serves to supply air pressure to the seal member 22 while allowing the upper motor cover 12 to be removed from sealed relationship with the lower motor cover 14.

Figure 3:
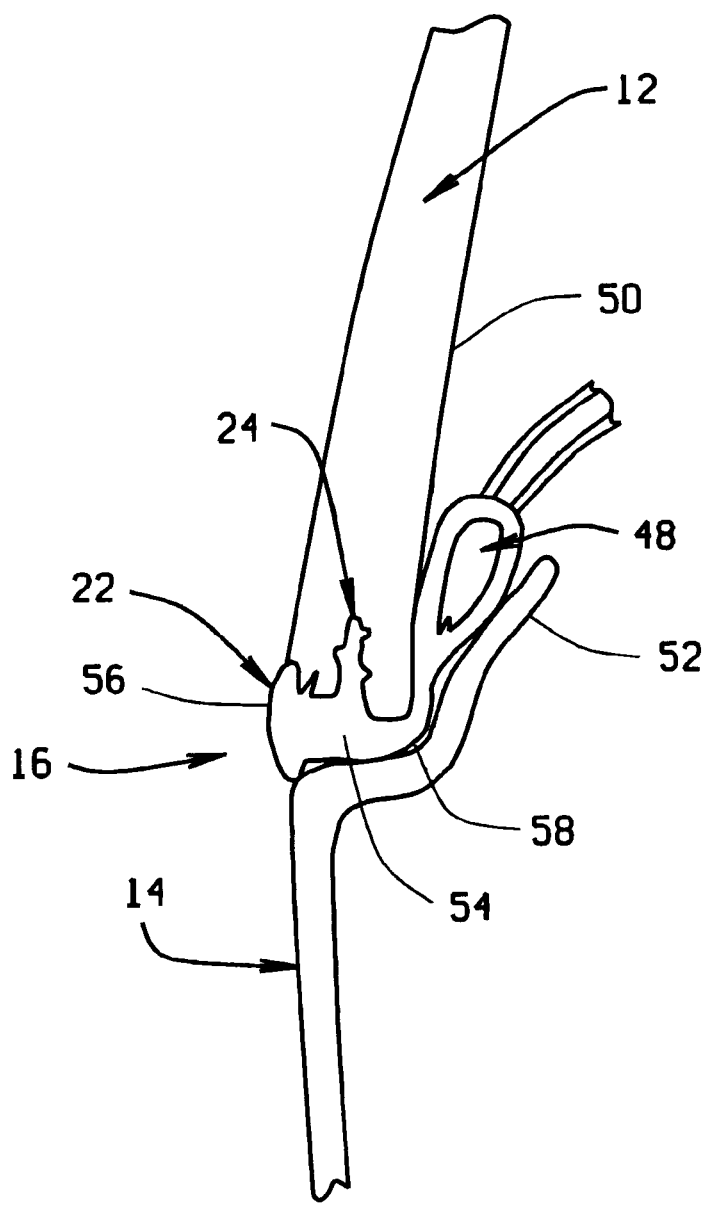
FIG. 3 is a cross-sectional view of a portion of the seal system shown in FIG. 2.

The sealing of the upper motor cover to the lower motor cover 14 can best be seen in FIG. 3. The seal member 22 is preferably configured with a hollow tubular portion 48 disposed between inside wall 50 of the motor cover 12 and an upstanding peripheral lip 52 formed on the lower motor cover 14. A solid portion 54 of the seal member 22 is also provided from which the projecting portion 24 extends and is disposed between lower edge 56 of the upper motor cover 12 and a peripheral rim 58 defined along the upper edge of the lower motor cover 14. When the cover 12 is secured to cover 14 as by a latching mechanism (not shown) the solid portion 54 of the seal member 22 creates a compression seal at the joint 16. When the tubular portion 48 of the seal member is pressurized as with air, the seal member 22 creates a substantially water impervious seal at the joint 16.

To provide a source of pressurized air to the seal member 22 it is preferred that the hose 46 extend from the valve 42 (FIG. 2) to the crankcase of the engine through a check valve 62 (FIG. 1). A suitable check valve for use in the system is of a type such as a rubber duck bill. The connection to the engine crankcase is particularly convenient and effective where the engine is of a two-stroke type. In two-stroke engines the crankcase is sealed from the atmosphere and on the down stroke of one of the pistons a pressure is generated in the crankcase. For example, linder, two-stroke, 150 horsepower motor manufactured by the pulse is generated as follows:

| RPM | PSI |
|---|---|
| 640 | 4.7 |
| 1000 | 4.78 |
| 2000 | 4.05 |
| 3000 | 3.88 |
| 4000 | 5.28 |
| 5000 | 7.15 |
| 5500 | 8.02 |

It is also important to note that the engine may be of a fuel injected type, whereupon there is no fuel vapor present in the crankcase. Thus, should the seal system fail there would only be air escaping from the crankcase. Of course, a separate air pump could also be used as an alternative to a crankcase connection.

Figure 4:
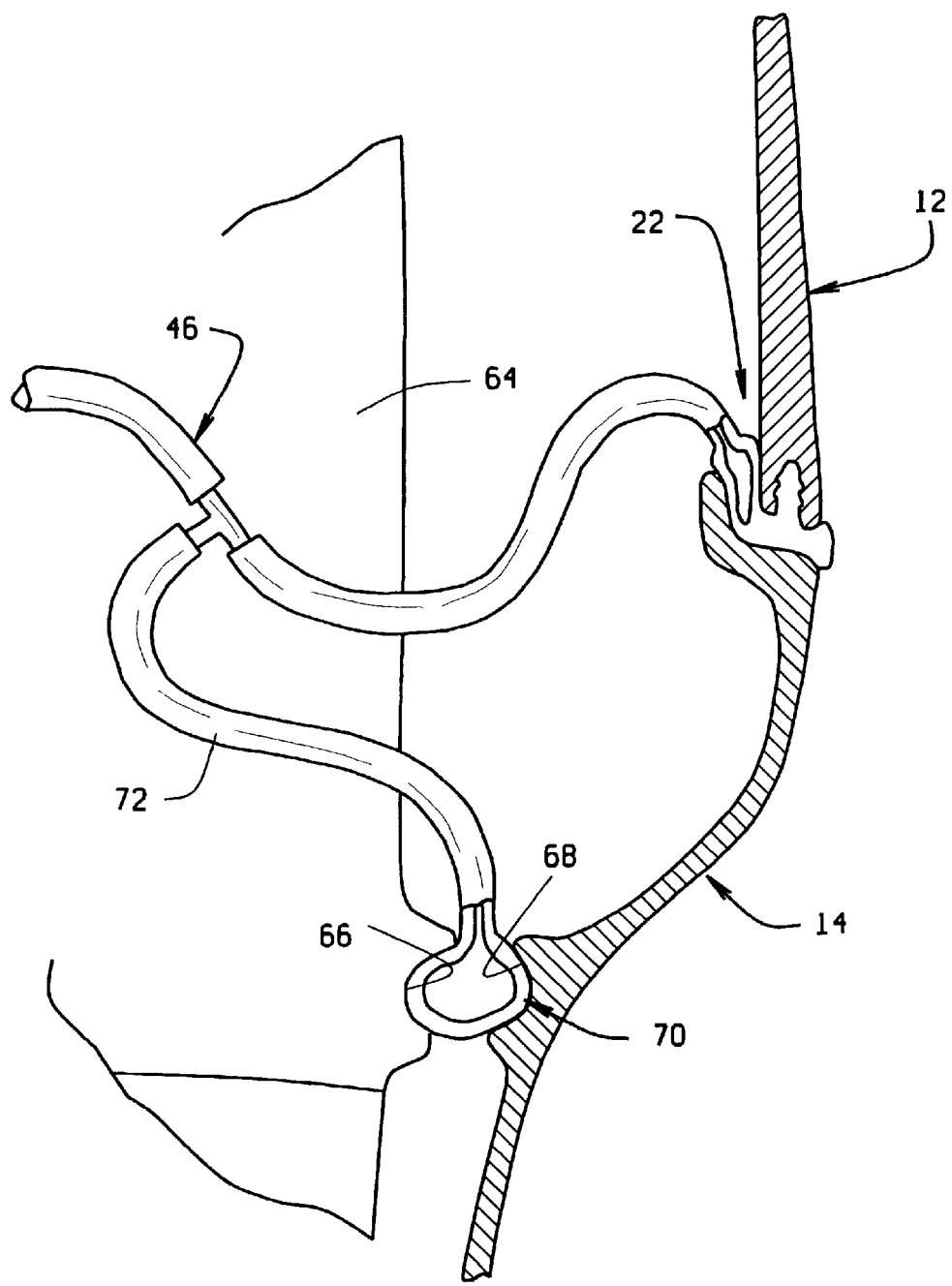
FIG. 4 is a cross-sectional view of a portion of another form of seal system constructed according to the invention.

A further use of the seal system is shown in FIG. 4. In this arrangement the engine powerhead 64 is provided with a lower groove 66 disposed adjacent a groove 68 in the lower motor cover 14. Positioned between the grooves 66 and 68 is a resilient hollow tube 70 connected by a hose 72 to the air supply hose 46. Thus, as the system is pressurized, the tube 70 expands and creates an impervious seal between the power head 64 and lower motor cover 14. This seal serves to prevent water from entering the powerhead enclosure from below.

It can now be appreciated that a seal system constructed according to the invention offers considerable advantages in protecting the engine powerhead of an outboard motor from water intrusion which can corrode and damage the engine. Referring again to FIG. 1, the seal system may be constructed to further provide for a pressurized tubing seal at the joint 20 formed between the lower motor cover 14 and the exhaust housing 18 as well the upper seal 22 and intermediate powerhead seal 70. The seal at the joint 20 may be formed similar to the upper seal 22.

While the present intention has been described in connection with preferred embodiments thereof, it will be apparent to those skilled in the art that many changes and modifications may be made without departing from the true spirit and scope of the present invention. Accordingly, it is intended by the appended claims to cover all such changes and modifications as come within the spirit and scope of the invention.

What is claimed is:

1. An outboard motor comprising:

an internal combustion engine;

a housing attached to said internal combustion engine;

a motor cover configured to attach to said housing; and a seal system providing an impervious seal at a joint between said housing and said motor cover, said seal system comprising a resilient hollow tubular seal member disposed between said motor cover and said housing, said seal system configured to be pressurized with air.

2. An outboard motor in accordance with claim 1 wherein said internal combustion engine is a two-stroke engine.

3. An outboard motor in accordance with claim 2 wherein said outboard motor includes a crankcase portion, said seal system configured to connect to the crankcase portion of the outboard motor.

4. An outboard motor in accordance with claim 3 wherein said seal system further comprises a supply tube and a check valve disposed in said supply tube, said supply tube configured to supply air to said seal system.

5. An outboard motor in accordance with claim 4 wherein said seal system further comprises a separable connector configured to removably connect said hollow tubular seal member to said supply tube.

6. An outboard motor in accordance with claim 5 wherein said separable connector comprises a valve needle and a cooperating valve seat, said valve seat configured to receive said valve needle.

7. An outboard motor in accordance with claim 1 wherein said hollow tubular seal member further comprises a projection, said motor cover comprises a slot formed along a peripheral edge thereof, said seal member projection configured to be received in said slot.

8. A seal system for an outboard motor comprising:

a housing attached to the outboard motor;

a motor cover configured to attach to the housing; and a hollow tubular configured to be disposed between said housing and said motor cover and connected to a supply line, said tubular seal configured to be pressurized with air from said supply line to seal a joint between said motor cover and said housing.

9. A seal system in accordance with claim 8 wherein said motor cover comprises a slot formed along a peripheral edge thereof, said tubular seal member configured to be comprises a projection configured to be received in said slot.

10. A seal system in accordance with claim 8 further comprising a separable connector configured to connect said seal member to said supply line.

11. A seal system in accordance with claim 10 wherein said separable connector comprises a valve assembly configured to provide passage for air to said seal system.

12. A seal system in accordance with claim 11 wherein said valve assembly comprises a valve seat and a cooperating valve needle.

13. A seal system in accordance with claim 12 wherein said supply line comprises a check valve disposed in said supply tube.

* * * * *